United States Patent [19]

Maruyama

[11] 3,968,701
[45] July 13, 1976

[54] POSITIVE MOTION BELT WITH ELASTIC TEETH

[75] Inventor: Masao Maruyama, Hanno, Japan

[73] Assignee: Tsubakimoto Chain Co., Ltd., Osaka, Japan

[22] Filed: Jan. 10, 1975

[21] Appl. No.: 540,255

[30] Foreign Application Priority Data
May 24, 1974  Japan.............................. 49-057783

[52] U.S. Cl. .............................. 74/229; 74/231 C; 156/138
[51] Int. Cl.² ...................... F16G 1/28; F16G 1/00; B29H 7/22
[58] Field of Search ............... 74/229, 216.5, 231 R, 74/231 C, 243 R; 156/138, 139, 140, 141, 142

[56] References Cited
UNITED STATES PATENTS

| | | |
|---|---|---|
| 2,870,490 | 1/1959 | Freedlander.................. 74/231 C X |
| 2,937,538 | 5/1960 | Worrall, Jr...................... 74/231 C |
| 3,002,396 | 10/1961 | Worrall, Jr............................ 74/229 |
| 3,404,576 | 10/1968 | Cicognani et al..................... 74/229 |
| 3,756,091 | 9/1973 | Miller................................ 74/231 C |

Primary Examiner—Samuel Scott
Assistant Examiner—Allan R. Burke
Attorney, Agent, or Firm—Woodhams, Blanchard and Flynn

[57] ABSTRACT

A positive motion belt transmission having an endless elastic toothed belt disposed in power transmitting engagement with a toothed wheel. The teeth on the wheel have convex surfaces adapted for engagement with the teeth on the belt. The teeth on the belt have concave surfaces which engage the convex surfaces on the teeth of the wheel to decrease the contact stress between the teeth during transmission of power between the wheel and the belt.

6 Claims, 11 Drawing Figures

POSITIVE MOTION BELT WITH ELASTIC TEETH

FIELD OF THE INVENTION

The present invention relates to a positive motion belt with elastic teeth of improved form.

BACKGROUND OF THE INVENTION

A positive motion belt with elastic teeth (hereinafter called the belt) of conventional type 1 has teeth 2 of all-addendum form, lacking part of the tooth tip and tooth root. The tooth surface 3 is straight, having a pressure angle $\alpha_o$. Reference numeral 4 designates the root fillet curve where the tooth root joins the bottom land 5. At the back of the bottom land 5 is laid a load carrying member 6, so that the pitch line 7 runs through the middle of said load carrying member 6. The tooth surface 3, bottom land 5 and top land 8 of the tooth 2 are covered, as required, with canvas or other material. On the inside of the tooth 2 and the back 9 of the belt 1 are filled rubber or rubber-like elastic material.

When the belt 1 is placed on wheels 40 and 40' as illustrated in FIG. 2, individual pitch circles 45 and 45' of the wheels 40 and 40' must overlap with the pitch line 7 of the belt 1. Therefore, the pitch circles 45 and 45' of the wheels 40 and 40' exist outside their addendum circles 44 and 44'. Consequently, their teeth 41 and 41' assume the all-addendum form. The belt 1 is manufactured by winding its material around an external gear 11 having teeth 12 shown in FIG. 3. The tooth space 13 and the tooth surface 14 of the external gear 11 form a tooth 2 and a tooth surface 3 respectively, of the belt. To make a belt having a straight-sided teeth, the tooth surface 14 of the external gear 11 must be straight-lined. The external gear 11 having such straight-sided teeth can be cut by the so-called single cutting machine. However, this tooth cutting method has such shortcomings as follows:

i. Since tooth cutting must be effected while driving one tooth after another, tooth pitch error is liable to be introduced.

ii. To permit the tip fillet curve 15 of the external gear 11, that forms the root fillet curve 4 of the belt 1, to smoothly join the outside diameter, it is necessary to use cutting machinery, workmanship and material of great accuracy for the manufacture of said external gear, which necessitates much time and labor.

iii. A gear cutting operation according to this method is inefficient.

The above-described shortcomings can be obviated by generating the external gear 11 by topping, utilizing a rack-type tool. However, the form of the tooth of the gear generated by the rack-type tool with straight-sided teeth is not straight-sided but involute. Therefore, the tooth form of the rack-type tool must be designed with a special curve in order to obtain a gear with straight-sided teeth by the generating process. In addition, the tooth form of the tool must be changed when the number of gear teeth changes. That is, a different rack-type tool is required for every different number of teeth of the external gear. This means that a great number of costly rack-type tools must be prepared. The manufacture, maintenance and keeping of such tools will cost a great deal, which, as a consequence, makes the generation of an external gear with straight-sided teeth by the use of the rack-type tool very expensive.

The present invention eliminates the aforesaid shortcomings, as described hereafter with reference to the accompanying drawings.

DETAILED DESCRIPTION

Figure 1:
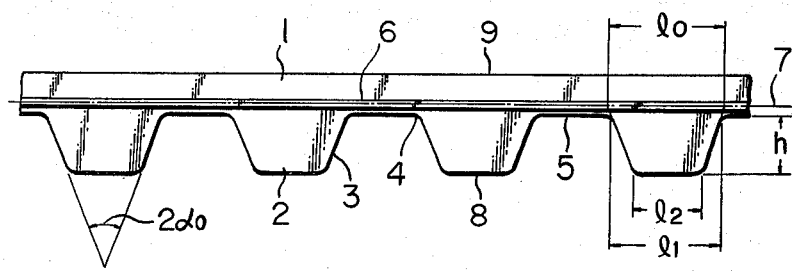
FIG. 1 is a side elevation of a conventional positive motion belt with straight-sided elastic teeth.
Figure 2:
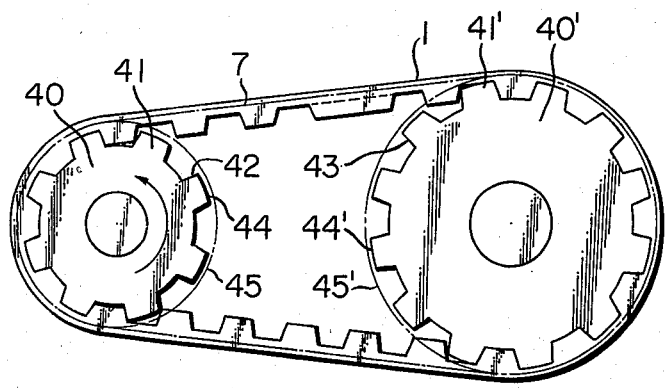
FIG. 2 is a side elevation of the same positive motion belt engagingly wound over wheels.
Figure 3:
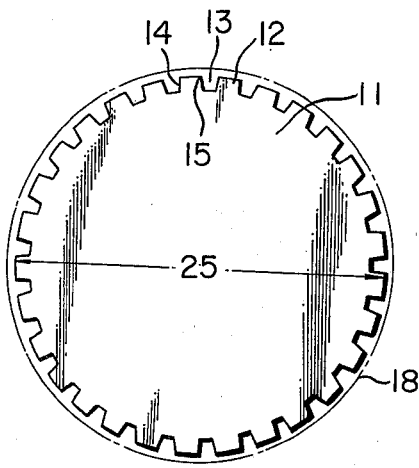
FIG. 3 illustrates an external gear.
Figure 4:
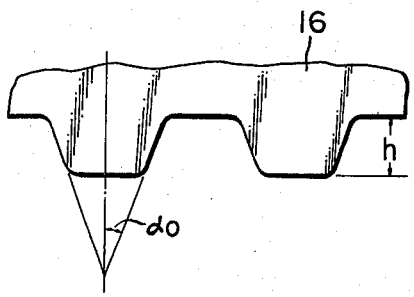
FIG. 4 illustrates a rack-type tool with a straight-sided tooth having a pressure angle $\alpha o$.
Figure 5:
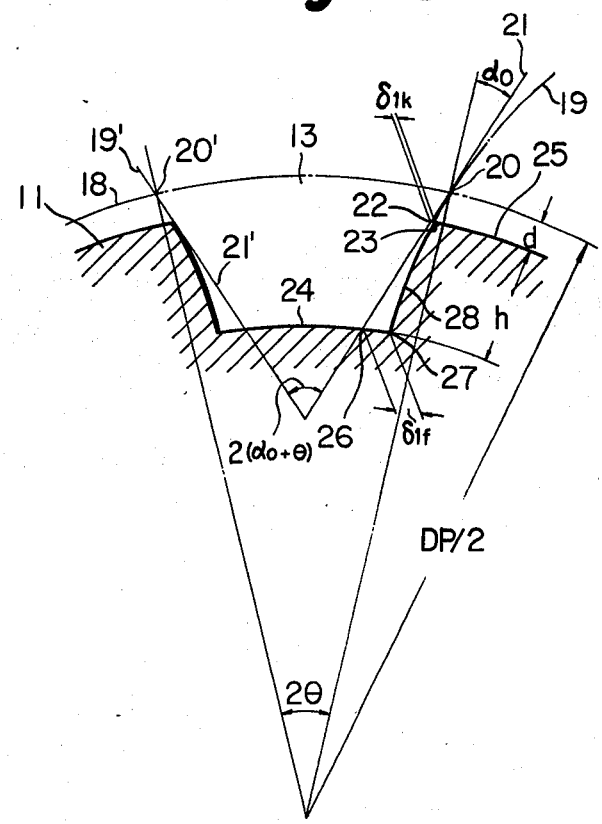
FIG. 5 shows the tooth form of an external gear generated by the rack-type tool shown in FIG. 4.

Referring to FIG. 5, the form of a tooth 28 of an external gear 11 cut by a rack-type tool 16 with straight-sided teeth having a pressure angle $\alpha_o$ (as shown in FIG. 4) assumes an involute curve 19 that has a pressure angle $\alpha_o$ on a pitch circle 18. When considering the tooth form of the tool and the external gear, chamfering at the edges of the tooth tip and the corners of tooth root as well as the radius of fillet are excepted. Assuming that the involute curve 19 and the pitch circle 18 intersect at point 20, the length of a circular arc 20-20' is equal to the virtual thickness $lo$ of the tooth 2 of the belt 1 on the pitch line 7. The virtual thickness $lo$ is a constant value that is determined by belt size expressed by pitch length between adjacent teeth of a belt or the like. There arises a deflection $\delta_1 k$ between points 22 and 23 where the tangent 21 of the involute curve 19 at point 20 and the involute curve 19 intersect the outside diameter 25 of the external gear 11, and a deflection $\delta_1 f$ between points 26 and 27 where said tangent 21 and involute curve 19 intersect the bottom land 24 of the external gear 11. The absolute values $\delta_1 k$ and $\delta_1 f$ become smaller with an increase in the number of teeth in the external gear 11; that is, $\delta_1 k$ and $\delta_1 f$ become zero when the number of teeth becomes infinite. Assuming now that $\delta_1 k$ and $\delta_1 f$ of an external gear having a minimum number of teeth are Dk and Df, the values of $\delta_1 k$ and $\delta_1 f$ become smaller than the absolute values of Dk and Df as the number of teeth of the external gear increases. $\delta_1 k$ and $\delta_1 f$ are calculated from the following equations:

$$\delta_1 k = \frac{Dp - 2d}{2}(\text{inv}\alpha o - \text{inv}\cos^{-1}\frac{Dp\cos\alpha o}{Dp - 2d}) - d\tan\alpha o$$

$$\delta_1 f = \frac{Dp - 2(d+h)}{2}\left\{\text{inv}\alpha o - \text{inv}\cos^{-1}\frac{Dp\cos\alpha o}{Dp - 2(d+h)}\right\} - (d+h)\tan\alpha o$$

where
$d = \frac{1}{2}$ of the difference between the outside diameter 25 of the external gear 11 and the diameter of the pitch circle 18

$Dp$ = The diameter of the pitch circle 18 of the external gear 11

$h$ = The depth of the tooth space 13 of the external gear 11

$\alpha o$ = The pressure angle of the rack-type tool 16 used for tooth cutting

It must be additionally noted that, within the range of the practically usable number of teeth on the external gear 11, a tooth surface 28 of the external gear 11 becomes totally consistent with the involute curve 19, owing to the tooth form conditions, including a pressure angle $\alpha o$, of the tool.

Figure 6:
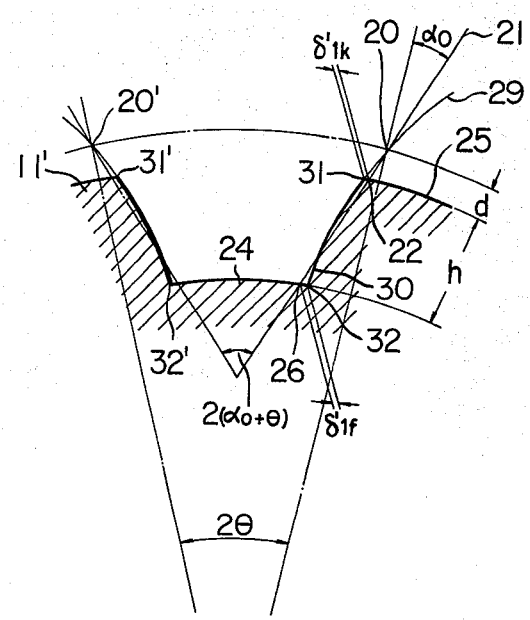
FIG. 6 shows the tooth form of an external gear generated by the rack-type tool with a straight-sided tooth having a pressure angle $\alpha o + \Delta \alpha$.

In FIG. 6, a tooth form 30 of an external gear 11' cut by a rack-type tool having straight-sided teeth with a pressure angle $\alpha o + \Delta \alpha$ coincides with an involute curve 29. There arise a deflection $\delta'_1 k$ between points 22 and 31 where the tangent 21 of the involute curve 19 and the involute curve 29 intersect the outside diameter 25 of the external gear 11', and a deflection $\delta'_1 f$ between points 26 and 32 where said tangent 21 and involute curve 29 intersect the bottom land 24 of the external gear 11'. $\delta'_1 k$ and $\delta'_1 f$ are calculated from the following equations, with the extent of each deflection being adjustable by $\Delta \alpha$:

$$\delta'_1 k = \frac{Dp - 2d}{2} \left\{ \text{inv} (\alpha o + \Delta \alpha) - \text{inv} \cos^{-1} \frac{Dp \cos (\alpha o + \Delta \alpha)}{Dp - 2d} \right\} - d \tan \alpha o$$

$$\delta'_1 f = \frac{Dp - 2(d + h)}{2} \left\{ \text{inv} (\alpha o + \Delta \alpha) - \text{inv} \cos^{-1} \frac{Dp \cos(\alpha o + \Delta \alpha)}{Dp - 2(d + h)} \right\} - (d + h) \tan \alpha o$$

Figure 7:
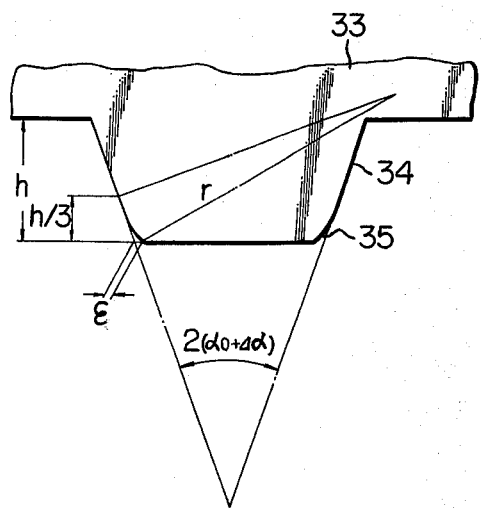
FIG. 7 illustrates a rack-type tool with a partly curved, straight-sided tooth.

The involute curve 29 increases its curvature and deviates more and more from the tangent 21 of the involute curve 19, as it approaches the bottom land 24 of the external gear 11'. It is therefore effective, for making small the value of $\delta'_1 f$ as well as the curvature at the root of the tooth form 30 of the external gear 11', to form the greater part of the tooth surface of a rack-type tool 33 shown in FIG. 7 with a straight line 34 and the remaining small part, for instance, about one-third from the tip of the tooth, with a curve 35. To be more precise, the tooth form of the external gear 11' generated by the straight-lined portion 34 of the rack-type tool 33 forms the involute curve 29, whereas the tooth form generated by the curved portion 35 presents a curve deflected in such a direction as to relatively narrow the width 32-32' of the bottom land 24, compared with the tooth form generated by an all straight-sided rack-type tool. The curved portion 35 of the tool 33 may be substituted by an arc of a circle. Assuming that the maximum values which said $\delta'_1 k$ can take is $D'k$ and that said $\delta'_1 f$ can take is $D'f$, the maximum amount of relief $\epsilon$ at the tooth tip of the tool 33 must be expressed by $\epsilon = D'f - D'k$.

If the angle formed between points 20 and 20' on the pitch circle 18 of the external gear 11 in FIG. 5 is 2$\theta$, the pressure angle of the involute curve 19 on the pitch circle 18 is $\alpha o$. Therefore, the angle of intersection of the tangents 21 and 21' of the involute curve 19 and 19' becomes $2(\alpha o + \theta)$, which is twice as great as the pressure angle $\alpha o$ of the tool, plus 2$\theta$. $\theta$ is calculated from the following equation:

$$\theta = \frac{20 - 20'}{Dp} = \frac{lo}{Dp}$$

Figure 8:
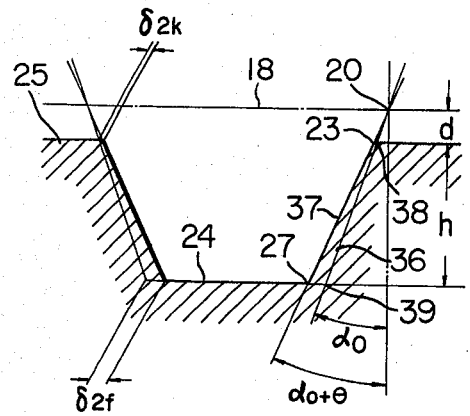
FIG. 8 schematically illustrates a difference in the tooth tip space of the belt, which results from a difference in angle between the pressure angle of the rack-type tool and the half core angle of the external gear.

In FIG. 8, let us consider two straight-sided tooth forms 36 and 37, having a pressure angle $\alpha o$ and $\alpha o + \theta$, respectively, at point 20 on the pitch circle 18. Then there arise deflections $\delta_2 k$ and $\delta_2 f$ between points 38 and 23 and points 39 and 27 where said tooth forms 36 and 37 intersect the outside diameter 25 and the bottom land 24. $\delta_2 k$ and $\delta_2 f$ are calculated from the following equations:

$$\delta_2 k = d \{\tan (\alpha o + \theta) - \tan \alpha o\}$$

$$\delta_2 f = (d + h) \{\tan (\alpha o + \theta) - \tan \alpha o\}$$

Assuming that the aforesaid $\delta_2 k$ and $\delta_2 f$ become $\delta'_2 k$ and $\delta'_2 f$ when the pressure angle $\alpha o$ is changed to $\alpha o + \Delta \alpha$, $\delta'_2 k$ and $\delta'_2 f$ are calculated from the following calculation:

$$\delta'_2 k = d \{\tan (\alpha o + \Delta \alpha + \theta) - \tan (\alpha o + \Delta \alpha)\}$$

$$\delta'_2 f = (d + h) \{\tan (\alpha o + \Delta \alpha + \theta) - \tan (\alpha o + \Delta \alpha)\}$$

Then, let us consider that:

$$2(\delta'_1 k + \delta'_2 k) = 2\delta' k$$

$$2(\delta'_1 f + \delta'_2 f) = 2\delta' f$$

From the above, $\delta' k$ and $\delta' f$ are defined as follows: $2\delta' k$ shows a difference between tooth thickness $l_1$ at the root of the tooth of the belt 1 with a straight-sided tooth 2 having a virtual tooth thickness $lo$ and pressure angle $\alpha o$ on the pitch line 7 and tooth space 31-31' on the outside diameter 25 of the external gear 11' cut by a rack-type straight-sided tooth-cutting tool having a pressure angle $\alpha o + \Delta \alpha$. $2\delta' f$ shows a difference between tooth thickness $l_2$ at the tip of the tooth of the same belt and tooth space 32-32' at the bottom land 24 of the external gear 11'.

With the assumption that $2\delta' k - 2\delta' f = 2\delta'$, $2\delta'$ is defined as showing a dimensional error permissible for an ideal tooth space (31-31' - 2$h$ tan$\alpha o$) at the bottom land 24 of the external gear 11', which determines the tooth tip thickness of the belt to be cut thereby, with respect to the tooth space 31-31' on the outside diameter 25 of said external gear 11'.

Figure 9:
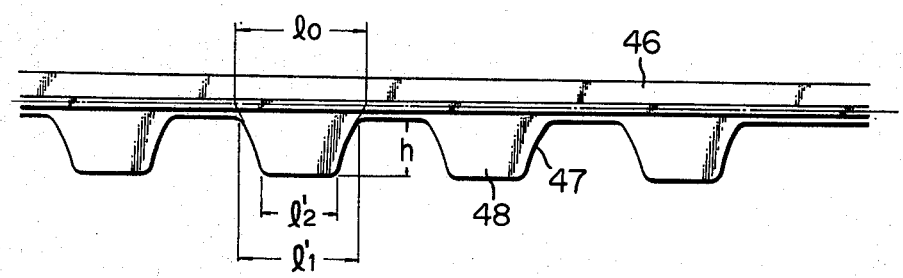
FIG. 9 shows a positive motion belt with a concave-surfaced elastic tooth, formed by the external gear having the tooth form shown in FIG. 6.

The thickness $l'_1$ and $l'_2$ at the tooth root and tip of the belt 46 (FIG. 9) cut by the external gear 11' having the aforementioned $2\delta' k$ and $2\delta' f$ differ with the number of teeth in the external gear 11'. At the same time, the tooth surface 47 of the belt 46 made by the external gear 11' forms a concave involute curve, because the external gear 11' has a convex involute tooth form 30.

The belt 1 and the toothed wheels 40 and 40' are considered to engage with each other as in the case of a rack and a pinion. If a belt 46 is considered a rack, the aforesaid $2\delta' k$ is a value affecting the back-lash existing between the tooth 48 of the belt 46 and the teeth 41 and 41' of the toothed wheels 40 and 40'. Also, $2\delta'$ calculated from equation $2\delta'k - 2\delta'f = 2\delta'$ and the concave curve on the tooth surface 47 of the belt 46 are considered tooth form errors.

The aforementioned $\delta'k$ and $\delta'f$ were calculated with regard to the belt tooth forms of every pitch specified in British Standards 4548-1970, Specifications for Synchronous Belt Drives, assuming that $\Delta\alpha$ is approximately one degree. For the belts having great pitch dimensions, the tooth form of external gears cut by a partly curved, straight-sided rack-type tool were considered. It was then found out about the tooth form of every pitch that the amount of change in $\delta'k$ (that is, the range of values which $\delta'k$ can take) with the number of teeth in the external gear was small, and all such values were positive. It was also found that the amount of change in $\delta'$ with the number of teeth in the external gear was small too, and, furthermore, the value of $\delta'$ could be kept within a range between a very small positive value to a small negative value or between zero and a small negative value, depending on how $\epsilon$ in FIG. 7 was determined. The positive $\delta'$ for the tooth tip space of the belt 46 becomes the amount of interference in the engaging mechanism of rack and pinion, while the negative $\delta'$ becomes that of relief. In the engagement of the belt 46 and the toothed wheels 40 and 40', the presence of a very small positive $\delta'$ does not constitute an obstacle to such engagement, because the tooth 48 of the belt 46, made of rubber-like elastic material, can permit some extent of transformation different from gears of hard metal. If the presence of such positive $\delta'$ is undesirable, it can be changed to negative regardless of the number of teeth of the belt, by changing the value of $\Delta\alpha$ or $\epsilon$ of the tool 33 shown in FIG. 7, or the interrelationship therebetween.

When the above-described belt 46, which differs, in tooth tip thickness slightly from the base dimention and has a concave tooth surface 47, is placed over the wheels 40 and 40' and moved, the belt smoothly engages the wheels.

The moment the teeth 2 and 48 of the belts 1 and 46, respectively, engage with the wheels 40 and 40', the tooth surfaces 3 and 47 of the belts 1 and 46 receive from the tooth surfaces 42 and 43 reactive force originated from power transmission.

Figure 10:
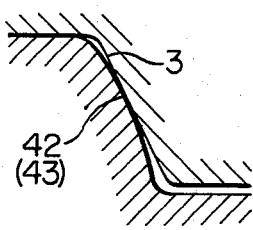
FIG. 10 illustrates a conventional engagement of a tooth of an involute-toothed wheel with a tooth of a belt having straight-sided teeth.
Figure 11:
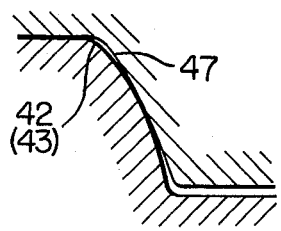
FIG. 11 illustrates an engagement of a tooth of an involute-toothed wheel with a tooth of a belt having concave-sided teeth, according to this invention.

For the transmission of power, it is more advantageous to engage the belt 46, having the concave tooth surface 47, of this invention with the wheels having the convex tooth surface 42 and 43, than to do so with the belt 1 with the straight-sided teeth 3, since the former produces less contact stress between both tooth surfaces (see FIGS. 10 and 11). Its superiority in durability has also been experimentally proven.

As described above, this invention permits cutting of external gears for the manufacture of timing belts having various numbers of teeth of the same pitch, using one rack-type gear-cutting tool. This means that one tool is enough for each pitch, thus eliminating the necessity of preparing many costly rack-type tools and facilitating the maintenance and keeping of such tools. Because the tooth form of this rack-type tool is straight-sided or partly curved, it can be more easily manufactured than a rack-type tool with totally curved teeth. Also the belt is designed with concave teeth so as to properly engage with convex-surfaced wheel teeth, which decreases contact stress during the transmission of power between both teeth and increases the durability of the teeth or the belt. These are the examples of remarkable results expected from this invention.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a positive motion endless belt having elastic teeth, said teeth having side faces adapted for engagement with a toothed wheel, comprising the improvement wherein the side faces are formed by a concave involute curve.

2. In a belt according to claim 1, wherein the adjacent teeth are separated by flat bottom lands, and wherein the teeth have flat top lands.

3. In a belt according to claim 2, wherein the concave involute curve forming each side face extends through substantially the full length of the side face from the adjacent top land to the adjacent bottom land.

4. In a positive motion belt transmission having an endless elastic toothed belt disposed in power transmitting engagement with a toothed wheel, comprising the improvement wherein the teeth on the belt have concave involute side faces which engage convex involute side surfaces on the teeth of the wheel to decrease the contact stress between the teeth during transmission of power between the wheel and the belt.

5. In a belt transmission according to claim 4, wherein the adjacent teeth on the belt are separated by substantially flat bottom lands, wherein the top lands of the belt teeth are substantially flat, and wherein the side faces diverge with respect to one another as they extend inwardly.

6. In a belt transmission according to claim 5, wherein the adjacent teeth on the wheel are separated by substantially flat bottom lands, wherein the teeth of the wheel also have substantially flat top lands, wherein the convex involute side surfaces of the teeth on the gear extend throughout substantially the full length of the side surfaces from the adjacent top land to the adjacent bottom land, and wherein the concave involute curve forming each side face of the teeth on the belt extends throughout substantially the full length of the side face from the adjacent top land to the adjacent bottom land.

\* \* \* \* \*